(12) United States Patent
Sakamoto et al.

(10) Patent No.: US 11,117,423 B2
(45) Date of Patent: Sep. 14, 2021

(54) PNEUMATIC TIRE

(71) Applicant: The Yokohama Rubber Co., LTD., Tokyo (JP)

(72) Inventors: Yousuke Sakamoto, Hiratsuka (JP); Atsushi Tanno, Hiratsuka (JP)

(73) Assignee: The Yokohama Rubber Co., LTD.

( * ) Notice: Subject to any disclaimer, the term of this patent is extended or adjusted under 35 U.S.C. 154(b) by 1073 days.

(21) Appl. No.: 15/113,412

(22) PCT Filed: Dec. 9, 2014

(86) PCT No.: PCT/JP2014/082562
§ 371 (c)(1),
(2) Date: Jul. 21, 2016

(87) PCT Pub. No.: WO2015/111315
PCT Pub. Date: Jul. 30, 2015

(65) Prior Publication Data
US 2017/0008354 A1    Jan. 12, 2017

(30) Foreign Application Priority Data
Jan. 23, 2014  (JP) .............................. JP2014-010418

(51) Int. Cl.
*B60C 19/00* (2006.01)
*B60C 9/22* (2006.01)
*B60C 11/03* (2006.01)

(52) U.S. Cl.
CPC .......... *B60C 19/002* (2013.01); *B60C 9/2204* (2013.01); *B60C 11/0304* (2013.01); *B60C 11/0306* (2013.01); *B60C 2009/2228* (2013.01)

(58) Field of Classification Search
CPC . B60C 11/03; B60C 11/0304; B60C 11/0306; B60C 19/002; B60C 5/00;
(Continued)

(56) References Cited

U.S. PATENT DOCUMENTS

2005/0155686 A1* 7/2005 Yukawa .................... B60B 3/04
                                                          152/450
2005/0161138 A1  7/2005 Yukawa et al.
(Continued)

FOREIGN PATENT DOCUMENTS

| CN | 101166637 | 4/2008 |
| CN | 101801688 | 8/2010 |

(Continued)

OTHER PUBLICATIONS

JPS64056203_Machine Translation (Year: 1989).*
(Continued)

*Primary Examiner* — Matthew J Daniels
*Assistant Examiner* — Yunju Kim
(74) *Attorney, Agent, or Firm* — Thorpe North & Western

(57) ABSTRACT

The pneumatic tire of the present technology includes: a tread portion; sidewall portions; and bead portions. A pattern of grooves is formed on the tread portion, and a strip-shaped sound-absorbing member is bonded along the tire circumferential direction to a region of the tire inner surface corresponding to the tread portion via an adhesive layer. A first ground contact region is defined between the tire ground contact edge on one side in the tire width direction and the tire equatorial plane, and a second ground contact region is defined between the tire ground contact edge on the other side in the tire width direction and the tire equatorial plane. The sound-absorbing member is offset with respect to the tire width direction so that the centroid of a cross-section of the sound-absorbing member in a plane that includes a tire axis is located within the first ground contact region.

13 Claims, 6 Drawing Sheets

(58) Field of Classification Search
CPC ..... B60C 9/22; B60C 9/2204; B60C 11/0066;
B60C 19/001; B60C 9/18; B60C 3/00;
B60B 3/04
USPC ................ 152/209.9, 450; 340/447
See application file for complete search history.

(56) References Cited

U.S. PATENT DOCUMENTS

| | | | |
|---|---|---|---|
| 2005/0205183 A1* | 9/2005 | Yukawa | ............. B60C 19/002 |
| | | | 152/450 |
| 2007/0146124 A1* | 6/2007 | Shinmura | ............. B60C 19/002 |
| | | | 340/447 |
| 2009/0038726 A1 | 2/2009 | Yukawa | |
| 2009/0277549 A1 | 11/2009 | Tanno | |
| 2009/0277551 A1 | 11/2009 | Yukawa | |
| 2009/0320980 A1 | 12/2009 | Tanno | |
| 2011/0220264 A1 | 9/2011 | Nagai | |
| 2012/0037294 A1 | 2/2012 | Yukawa | |
| 2012/0175032 A1 | 7/2012 | Yukawa | |
| 2013/0098522 A1 | 4/2013 | Tanno | |
| 2013/0098533 A1 | 4/2013 | Tanno | |

FOREIGN PATENT DOCUMENTS

| | | |
|---|---|---|
| JP | S64-056203 | 3/1987 |
| JP | H06-0336102 | 12/1994 |
| JP | 2005-212524 | 8/2005 |
| JP | 2005-262920 | 9/2005 |
| JP | 2006-306285 | 11/2006 |
| JP | 2007-326555 | 12/2007 |
| JP | 2010-173573 | 8/2010 |
| JP | 2010-188782 | 9/2010 |
| JP | 2013-014141 | 1/2013 |
| JP | 2013-112062 | 6/2013 |
| WO | WO 2006/117944 | 11/2006 |
| WO | WO 2006/118200 | 11/2006 |
| WO | WO 2007/129637 | 11/2007 |
| WO | WO 2009/034912 | 3/2009 |

OTHER PUBLICATIONS

JPH06336102A_Machine Translation (Year: 1994).*
JP2010173573A_Machine Translation (Year: 2010).*
International Search Report for International Application No. PCT/JP2014/082562 dated Feb. 24, 2015, 4 pages, Japan.

* cited by examiner

PNEUMATIC TIRE

TECHNICAL FIELD

The present technology relates to a pneumatic tire with a strip-shaped sound-absorbing member bonded to a region of the tire inner surface corresponding to the tread portion, and more particularly relates to a pneumatic tire capable of correcting weight unbalance between the two sides of the tire equatorial plane, and reducing peeling of the sound absorbing member.

BACKGROUND ART

In pneumatic tires, cavernous resonance caused by the vibration of air that the tire is filled with is one cause of noise being generated. When a tire is rolled, uneven road surfaces cause a tread portion to vibrate. The vibrations of the tread portion cause the air inside the tire to vibrate which causes cavernous resonance to be generated.

It has been suggested that a sound-absorbing member is provided within the cavity formed between the tire and the rim of the wheel as a way to reduce this cavernous resonance. More specifically, a strip-shaped sound-absorbing member is bonded to a region of the tire inner surface corresponding to the tread portion (for example, see Japanese Unexamined Patent Application Publication Nos. 2005-212524A, 2005-262920A and 2013-112062A).

However, when a strip-shaped sound-absorbing member is bonded to a region of the tire inner surface corresponding to the tread portion, the problem of peeling of the sound-absorbing member when the tire is running can occur. In particular, with pneumatic tires in which the groove area ratio on the tread portion is different on the two sides of the tire equatorial plane thereby producing a weight unbalance between the two sides of the tire equatorial plane, when a strip-shaped sound-absorbing member is bonded to the region of the tire inner surface corresponding to the tread portion, the occurrence of this peeling of the sound-absorbing member tends to be more pronounced.

SUMMARY

The present technology provides a pneumatic tire with a strip-shaped sound-absorbing member bonded to a region of the tire inner surface corresponding to the tread portion, that is capable of correcting weight unbalance between the two sides of the tire equatorial plane, and reducing peeling of the sound absorbing member.

Solution to Problem

The pneumatic tire according to the present technology includes: an annular tread portion extending in the tire circumferential direction; a pair of sidewall portions disposed on two sides of the tread portion; and a pair of bead portions disposed on the inner side in the tire radial direction of the sidewall portions. A pattern of grooves is formed on the tread portion, and a strip-shaped sound-absorbing member is bonded along the tire circumferential direction to a region of the tire inner surface corresponding to the tread portion via an adhesive layer. A first ground contact region is defined between the tire ground contact edge on one side in the tire width direction and the tire equatorial plane, and a second ground contact region is defined between the tire ground contact edge on the other side in the tire width direction and the tire equatorial plane. The groove area ratio of the first ground contact region is greater than the groove area ratio of the second ground contact region, and the sound-absorbing member is disposed in a position offset with respect to the tire width direction so that the centroid of a cross-section of the sound-absorbing member in a plane that includes the tire axis is located within the first ground contact region.

The inventors carried out diligent research into the behavior of the tread portion and the adhesive state of the sound-absorbing member in pneumatic tires having a strip-shaped sound-absorbing member bonded along the tire circumferential direction to the tire inner surface corresponding to the tread surface via the adhesive layer, in which there was a weight unbalance between the two sides of the tire equatorial plane due to the groove area ratio of the tread portion. It was discovered that with pneumatic tires having a weight unbalance as described above, strain was generated in the tread portion due to this weight unbalance during high-speed traveling and this strain promoted peeling of the sound-absorbing member.

In other words, in the present technology, the groove area ratio of the first ground contact region is larger than the groove area ratio of the second ground contact region, and the sound-absorbing member is disposed in a position offset in the tire width direction so that the centroid of the cross-section of the sound-absorbing member in a plane that includes the axis of the tire is positioned within the first ground contact region. Therefore the weight unbalance between the two sides of the tire equatorial plane due to the difference in the groove area ratio of the first ground contact region and the groove area ratio of the second ground contact region can be corrected. In addition the strain induced in the tread portion due to the weight unbalance during high-speed traveling can be reduced, and peeling of the sound-absorbing member caused by this strain can be reduced. As a result, the noise reduction effect of the sound-absorbing member can be maintained over a long period of time.

In the present technology, the tire ground contact edge is the position of the edge in the tire axial direction of the ground contact region when the tire is assembled onto a regular rim, inflated with the regular inner pressure, placed vertically on a horizontal surface, and the regular load is applied, and the ground contact width is the width in the tire axial direction of the ground contact region. A "regular rim" is a rim defined by a standard for each tire according to a system of standards that includes standards on which tires are based, and refers to a "standard rim" in the case of Japan Automobile Tyre Manufacturers Association (JATMA), refers to a "Design Rim" in the case of Tire and Rim Association (TRA), and refers to a "Measuring Rim" in the case of European Tyre and Rim Technical Organisation (ETRTO). However, if the tire is to be mounted on a new vehicle, the genuine wheel on which the tire is fitted shall be used. "Regular inner pressure" is the air pressure defined by standards for each tire according to a system of standards that includes standards on which tires are based, and refers to the "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However if the tire is to be fitted to a new vehicle, the air pressure shall be that indicated on the vehicle. "Regular load" is the load defined by standards for each tire according to a system of standards that includes standards on which tires are based, and refers to the "maximum load capacity" in the case of JATMA, refers to the maximum value in the table of "TIRE ROAD LIMITS AT VARIOUS COLD INFLATION PRESSURES" in the case of TRA, and refers to the "LOAD CAPACITY" in the case of ETRTO. However the load shall be the equivalent of 88% of this load for a tire on a passenger vehicle. In the case of a tire fitted to a new vehicle, the wheel load shall be obtained by dividing the front and rear axle loads stated in the vehicle inspection certificate of the vehicle by two.

Also, the groove area ratio of the first ground contact region is the ratio of the total groove area of the first ground contact region to the total area of the first ground contact region, and the total groove area of the first ground contact region is the sum total of the area of all the grooves in the first ground contact region. Likewise, the groove area ratio of the second ground contact region is the ratio of the total groove area of the second ground contact region to the total area of the second ground contact region, and the total groove area of the second ground contact region is the sum total of the area of all the grooves in the second ground contact region.

In the present technology, preferably the total groove area of the second ground contact region is from 70 to 92% of a total groove area of the first ground contact region, and the distance from the centroid of the sound-absorbing member to the tire equatorial plane is from 5 to 30% of the ground contact width of the tread portion. In other words, the present technology is particularly effective when the difference in the total groove area of the first ground contact region and the total groove area of the second ground contact region is within the above range, and when the distance from the centroid of the sound-absorbing member to the tire equatorial plane is within the above range an excellent effect is exhibited.

In the present technology, preferably the pneumatic tire has a designated mounting orientation with respect to a vehicle, the first ground contact region is disposed on the vehicle inner side, and the second ground contact region is disposed on the vehicle outer side. In other words, in the pneumatic tire with the designated mounting orientation with respect to the vehicle, by disposing the first ground contact region with a comparatively large groove area ratio on the vehicle inner side, the wet performance is ensured. Also by disposing the second ground contact region with a comparatively small groove area ratio on the vehicle outer side, the steering stability on dry road surfaces can be improved. More specifically, in this case preferably the groove area ratio of the first ground contact region is from 30 to 43%, and the groove area ratio of the second ground contact region is from 25 to 35%.

In the pneumatic tire with the mounting orientation with respect to a vehicle designated, preferably a belt layer, an inside belt edge cover layer that locally covers the edge of the belt layer on the vehicle inner side, and an outside belt edge cover layer that locally covers the edge of the belt layer on the vehicle outer side are embedded in the tread portion, and the stiffness of the inside belt edge cover layer is greater than the stiffness of the outside belt edge cover layer. High-performance tires are normally mounted on vehicles having negative camber angle, and it is required that sufficient high speed durability be provided under these conditions of use. However heat build-up can easily occur at positions on the vehicle inner side of the tread portion due to the negative camber angle, so this heat build-up adversely affects the adhesive layer of the sound-absorbing member, causing adhesive peeling of the sound-absorbing member. In this respect, when the stiffness of the inside belt edge cover layer is greater than the stiffness of the outside belt edge cover layer, deformation of the tread portion at the vehicle inner side is reduced, so heat build-up at that location is reduced, and the adhesive peeling of the sound-absorbing member can be effectively prevented.

Preferably means for making the stiffness of the inside belt edge cover layer greater than the stiffness of the outside belt edge cover layer include making the width of the inside belt edge cover layer greater than the width of the outside belt edge cover layer, or making the number of layers of the inside belt edge cover layer greater than the number of layers of the outside belt edge cover layer. In this case, an asymmetrical structure of the inside belt edge cover layer and the outside belt edge cover layer can be easily formed, and adhesive peeling of the sound-absorbing member can be effectively prevented.

Preferably the sound-absorbing member is a single sound absorbing member extending in the tire circumferential direction, having a constant thickness at least in the region corresponding to the bonding surface in a cross-section orthogonal to the longitudinal direction of the sound absorbing member, and the cross-sectional shape thereof is constant along the longitudinal direction. In this way, the capacity of the sound-absorbing member per unit ground contact area is increased as much as possible, and an excellent noise reduction effect can be obtained. Also, the sound-absorbing member can be easily processed to have this shape, so the manufacturing cost is low.

Preferably the volume of the sound-absorbing member as a percentage of the volume of the cavity formed within the tire when the tire is assembled on the rim is more than 20%. By increasing the volume of the sound-absorbing member in this way an excellent noise reduction effect can be obtained, and moreover a good bonding state can be maintained over a long period of time, even with a large sound-absorbing member. The cavity volume is the volume of the cavity formed between the tire and the rim with the tire assembled onto the regular rim and filled with the regular inner pressure.

Preferably the hardness of the sound-absorbing member is from 60 to 170 N, and the tensile strength of the sound-absorbing member is from 60 to 180 kPa. A sound-absorbing member with these physical properties has excellent durability against shear strain. The hardness of the sound-absorbing member is measured by method D (method for calculating strength after constant 25% compression for 20 seconds) in accordance with Japanese Industrial Standard JIS-K6400-2 "Flexible cellular polymeric materials—Physical properties—Part 2: Determination of hardness and stress-strain characteristics in compression". Also the tensile strength of the sound-absorbing member is measured in accordance with JIS-K6400-5 "Flexible Cellular Polymeric Materials—Physical Properties—Part 5: Determination Of Tensile Strength, Elongation At Break And Tear Strength".

Preferably the adhesive layer is formed from double-sided adhesive tape, and the peeling adhesive strength thereof is in the range of 8 to 40 N/20 mm. In this way the work of applying the sound-absorbing member and the work of dismantling when the tire is being disposed of can be easily carried out, while maintaining good fixing strength of the sound-absorbing member. The peeling adhesive strength of the double-sided adhesive tape is measured in accordance with JIS-Z0237. In other words, the double-sided adhesive tape is lined by applying 25 μm thick PET (PolyEthylene Terephthalate) film. Test pieces are prepared by cutting the lined adhesive sheet into squares 20 mm×200 mm. The peeling liner is peeled off the test piece, and the exposed adhesive surface is applied to a stainless steel plate (SUS304, surface finish BA) as the adherend, and a 2 kg roller shall be rolled forward and back over it. After holding the test piece in a 23° C., RH 50% environment for 30 minutes, the test piece shall be peeled at 180° from the SUS plate under a 23° C., RH 50% environment at a pulling speed of 300 mm/minute using a tensile tester to measure the peeling adhesive strength in accordance with JIS Z0237.

DETAILED DESCRIPTION

A detailed description of the configuration of the present technology is given below, with reference to the accompanying drawings. FIGS. 1 to 4 illustrate a pneumatic tire according to an embodiment of the present technology. The pneumatic tire is a tire having a designated tire front/back mounting direction when mounted on a vehicle. In FIGS. 1 to 4, IN corresponds to the inner side of a vehicle when the pneumatic tire is mounted on the vehicle and OUT corresponds to the outer side of a vehicle when the pneumatic tire is mounted on the vehicle. This mounting orientation with respect to the vehicle is displayed on the tire outer surface.

Figure 1:
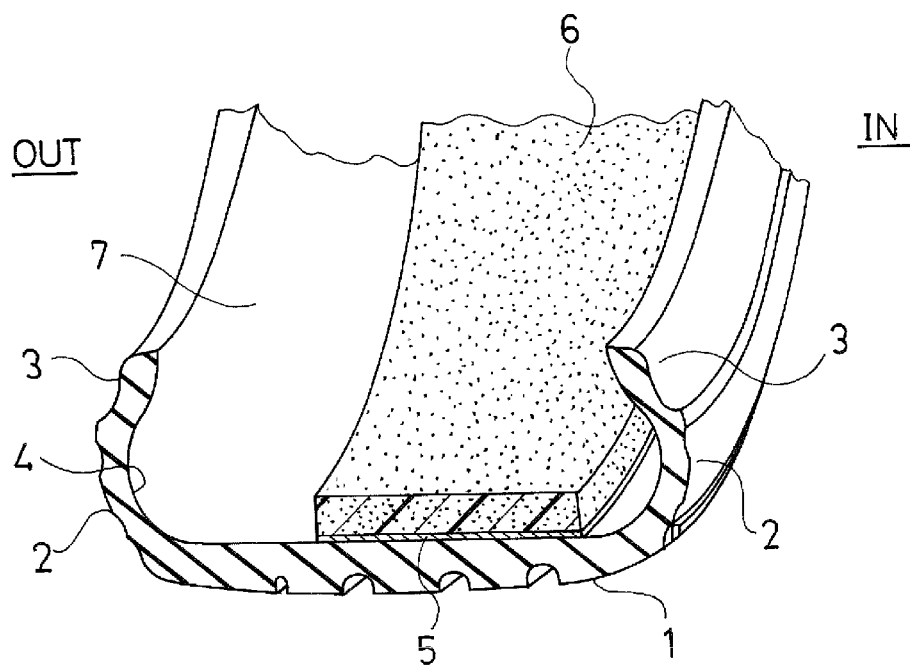
FIG. 1 is a perspective cross-sectional view illustrating a pneumatic tire according to an embodiment of the present technology.
Figure 2:
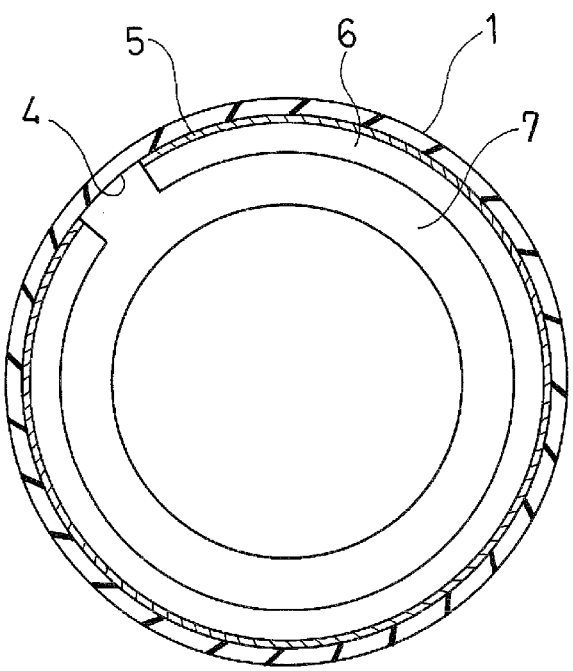
FIG. 2 is a cross-sectional view at the equatorial line illustrating a pneumatic tire according to an embodiment of the present technology.
Figure 3:
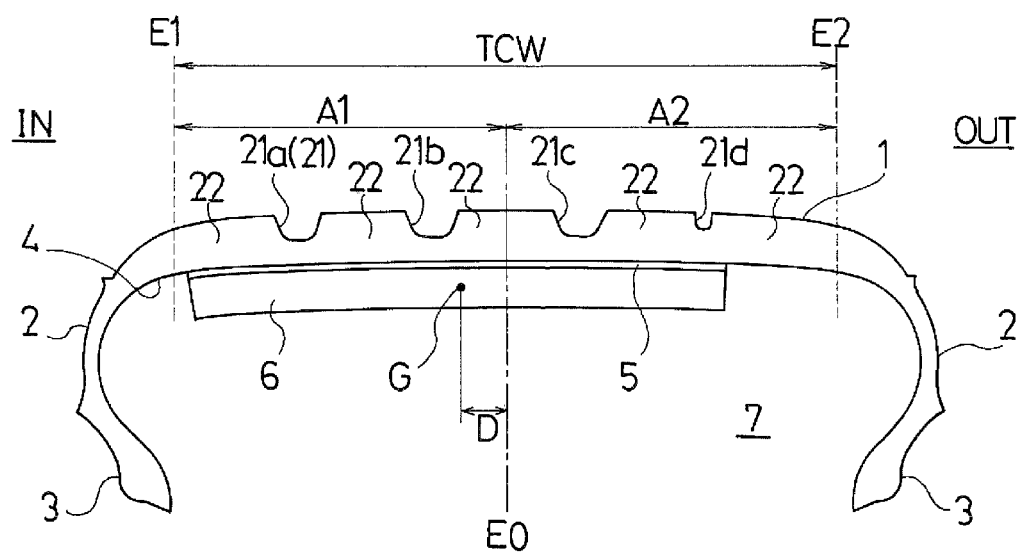
FIG. 3 is a meridian cross-sectional view illustrating a pneumatic tire according to an embodiment of the present technology.

In FIGS. 1 to 3, the pneumatic tire according to the present embodiment is provided with an annular-shaped tread portion 1 extending in the tire circumferential direction, a pair of sidewall portions 2 disposed on both sides of the tread portion 1, and a pair of bead portions 3 disposed on the inner side of the sidewall portions 2 in the tire radial direction.

In the pneumatic tire as described above, a strip-shaped sound-absorbing member 6 is bonded along the tire circumferential direction to a region of the tire inner surface 4 corresponding to the tread portion 1, via an adhesive layer 5. The sound-absorbing member 6 is configured from a porous material having open cells, and has predetermined noise absorbing properties based on the porous structure. Urethane foam may be used as the porous material of the sound-absorbing member 6. On the other hand, adhesive in paste form or double-sided adhesive tape can be used as the adhesive layer 5.

Figure 4:
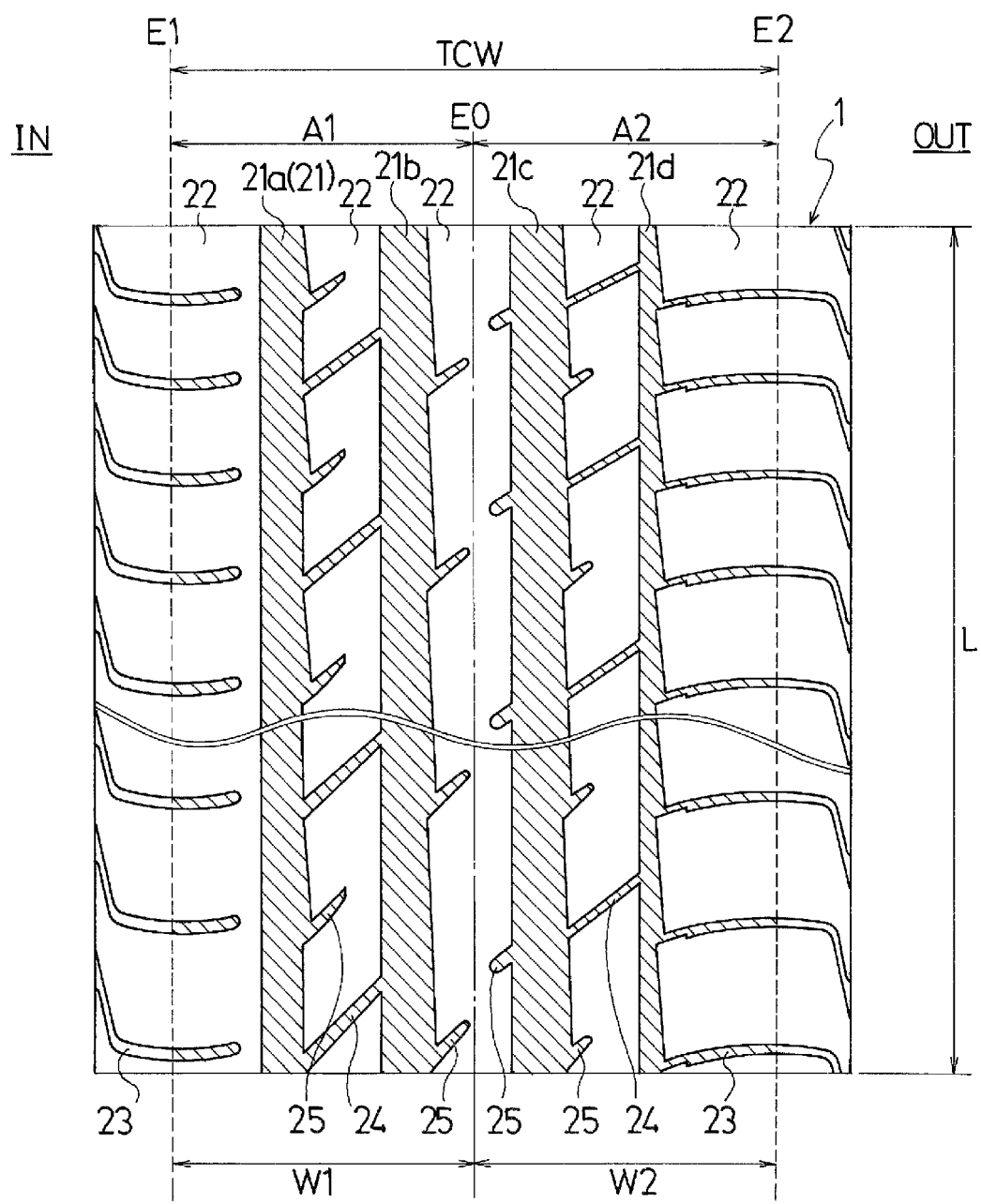
FIG. 4 is a developed view illustrating a tread pattern of a pneumatic tire according to an embodiment of the present technology.

As illustrated in FIG. 4, the required groove pattern is formed in the tread portion 1. In other words, four circumferential grooves 21 (21a, 21b, 21c, 21d) extending in the tire circumferential direction are formed in the tread portion 1. These circumferential grooves 21 partition and form five rows of land portions 22. The circumferential groove 21d located on the vehicle outer side has a narrower groove width than the other circumferential grooves 21a to 21c. Also, lug grooves 23, inclined grooves 24, or notch grooves 25 extending in the tire width direction are formed in the land portions 22.

When a first ground contact region A1 is specified between the tire ground contact edge E1 on one side in the tire width direction (the vehicle inner side) and the tire equatorial plane E0, and a second ground contact region A2 is specified between the tire ground contact edge E2 on the other side in the tire width direction (the vehicle outer side) and the tire equatorial plane E0, the groove area ratio R1 of the first ground contact region A1 is set larger than the groove area ratio R2 of the second ground contact region A2.

The groove area ratio R1 of the first ground contact region A1 and the groove area ratio R2 of the second ground contact region A2 are specified on the basis of the groove pattern including the circumferential grooves 21, the lug grooves 23, the inclined grooves 24, and the notch grooves 25 formed in the tread portion 1. More specifically, as illustrated in FIG. 4, if the width of the first ground contact region A1 is W1, the width of the second ground contact region A2 is W2, and the tire circumferential length is L, the total area S1 of the first ground contact region A1 and the total area S2 of the second ground contact region A2 are calculated from $S1=W1 \times L$ and $S2=W2 \times L$ respectively. The total groove area G1 of the first ground contact region A1 is the area of the portion (hatched portion) of the tread surface within the first ground contact region A1 that does not contact the ground over the entire periphery. Similarly the total groove area G2 of the second ground contact region A2 is the area of the portion (hatched portion) of the tread surface within the second ground contact region A2 that does not contact the ground over the entire periphery. Then the groove area ratio R1 of the first ground contact region A1 and the groove area ratio R2 of the second ground contact region A2 are calculated from $R1=G1/S1 \times 100\%$ and $R2=G2/S2 \times 100\%$ respectively.

On the other hand, the sound-absorbing member 6 is disposed in a position that is offset in the tire width direction, as illustrated in FIG. 3, so that the centroid G of the cross-section of the sound-absorbing member 6 in a plane that includes the axis of the tire (meridian cross-section) is positioned within the first ground contact region A1. Note that there is a single sound-absorbing member 6 disposed at the tread portion 1 in the tire meridian cross-section, and there is not a plurality of sound-absorbing members 6 arranged in the tire width direction.

In the pneumatic tire configured in this way, the strip-shaped sound-absorbing member 6 is bonded along the tire circumferential direction to a region of the tire inner surface 4 corresponding to the tread portion 1 via the adhesive layer 5, the groove area ratio R1 of the first ground contact region A1 is larger than the groove area ratio R2 of the second ground contact region A2, and the sound-absorbing member 6 is disposed in a position offset in the tire width direction so that the centroid G of the cross-section of the sound-absorbing member 6 in a plane that includes the axis of the tire is positioned within the first ground contact region A1. Therefore the weight unbalance between the two sides of the tire equatorial plane E0 due to the difference in the groove area ratio R1 of the first ground contact region A1 and the groove area ratio R2 of the second ground contact region A2 can be corrected. If there is a large weight unbalance in the tread portion 1, the relatively heavy portion will greatly expand due to centrifugal force during high-speed traveling, causing strain to be produced in the tread portion 1. However by correcting the weight unbalance, the strain in the tread portion 1 during high-speed traveling is reduced, so peeling of the sound-absorbing member 6 caused by this strain can be reduced. As a result, the noise reduction effect of the sound-absorbing member 6 can be maintained over a long period of time.

Also, by correcting the weight unbalance of the tread portion 1, the effect of improvement in steering stability during high-speed traveling can also be obtained. In other words, if there is a weight unbalance in the tread portion 1, in high-speed traveling at for example 270 km/h or more, the ground contact shape becomes asymmetrical on the two sides of the tire equatorial plane E0 due to centrifugal force on the tread portion 1, and the steering stability is reduced. However by correcting the weight unbalance, excellent steering stability can be exhibited during high-speed traveling.

Figure 5:
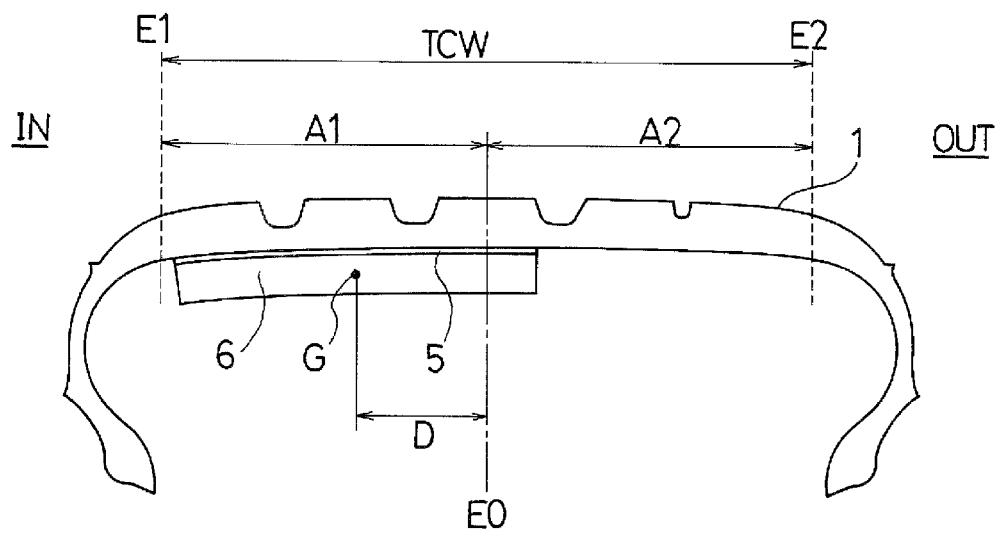
FIG. 5 is a meridian cross-sectional view illustrating a pneumatic tire according to another embodiment of the present technology.
Figure 6:
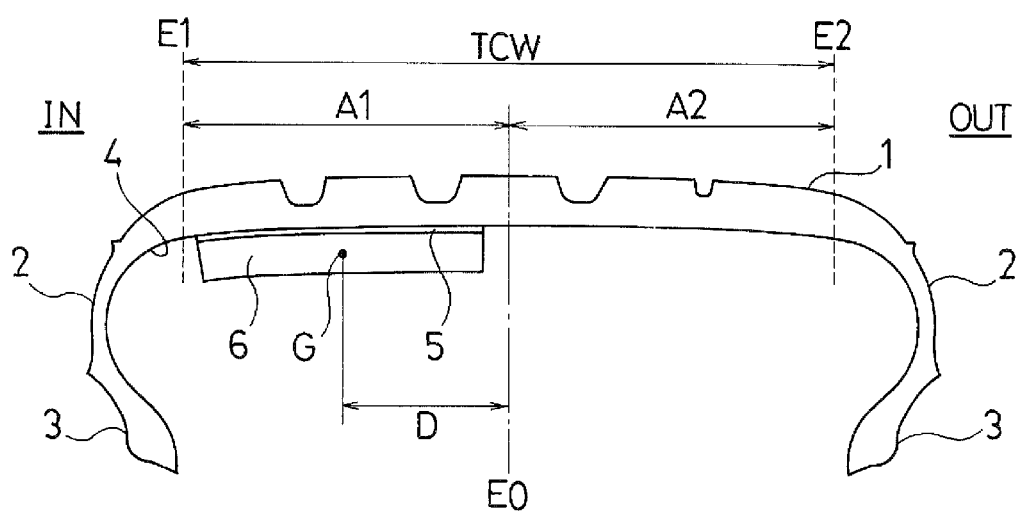
FIG. 6 is a meridian cross-sectional view illustrating a pneumatic tire according to another embodiment of the present technology.

FIGS. 5 to 6 each illustrate pneumatic tires according to another embodiments of the present technology. In the embodiments of FIGS. 5 and 6, the width of the sound-absorbing member 6 is smaller compared with the embodiment of FIG. 3, and the offset in its arrangement is larger. In FIG. 3 the sound-absorbing member 6 is arranged so that it extends over the tire equatorial plane E0 on both sides, but in FIG. 6 the sound-absorbing member 6 is disposed on just one side of the tire equatorial plane E0. In other words, the sound-absorbing member 6 is contained within the first ground contact region A1.

In the pneumatic tire as described above, the total groove area G2 of the second ground contact region A2 may be from 70 to 92% of the total groove area G1 of the first ground contact region A1, and the distance D from the centroid G of the sound-absorbing member 6 to the tire equatorial plane E0 may be from 5 to 30% of the ground contact width TCW of the tread portion 1. In this case a significant effect can be expected.

Here, when the total groove area G2 of the second ground contact region A2 is smaller than 70% of the total groove area G1 of the first ground contact region A1, the wear characteristics deteriorate. Conversely when it is greater than 92% the difference between the two becomes small, so the necessity of correcting the weight unbalance becomes substantially unnecessary. In particular, preferably the total groove area G2 of the second ground contact region A2 is from 72 to 90% of the total groove area G1 of the first ground contact region A1, and more preferably may be from 75 to 90% of the total groove area G1 of the first ground contact region A1.

Also, when the distance D from the centroid G of the sound-absorbing member 6 to the tire equatorial plane E0 is smaller than 5% of the ground contact width TCW of the tread portion 1, the effect of correcting the weight unbalance is insufficient. Conversely when it is greater than 30% it is necessary to arrange the sound-absorbing member 6 as far as the curved portion on the shoulder side, so the bond durability of the sound-absorbing member 6 is reduced. In particular, preferably the distance D from the centroid G of the sound-absorbing member 6 to the tire equatorial plane E0 may be from 7 to 25% of the ground contact width TCW of the tread portion 1, and more preferably be from 10 to 20% of the ground contact width TCW of the tread portion 1.

In the pneumatic tire with the designated mounting orientation with respect to the vehicle as described above, by providing the first ground contact region A1 with a comparatively large groove area ratio R1 on the vehicle inner side the wet performance is ensured, and by providing the second ground contact region A2 with a comparatively small groove area ratio R2 on the vehicle outer side the steering stability on dry road surfaces can be improved. However in this case preferably the groove area ratio R1 of the first ground contact region A1 is from 30 to 43%, and the groove area ratio R2 of the second ground contact region A2 is from 25 to 35%. In particular, the groove area ratio R1 of the first ground contact region A1 may be from 33 to 49%, and the groove area ratio of the second ground contact region may be from 28 to 33%. Also, preferably the difference between the groove area ratio R1 of the first ground contact region A1 and the groove area ratio R2 of the second ground contact region A2 is 4.0 percentage points or more, and more preferably is 5.5 percentage points or more. By setting the groove area ratio R1 of the first ground contact region A1 and the groove area ratio R2 of the second ground contact region A2 in the above ranges, the wet performance and the steering stability on dry road surfaces can be ensured in a balanced manner.

Figure 7:
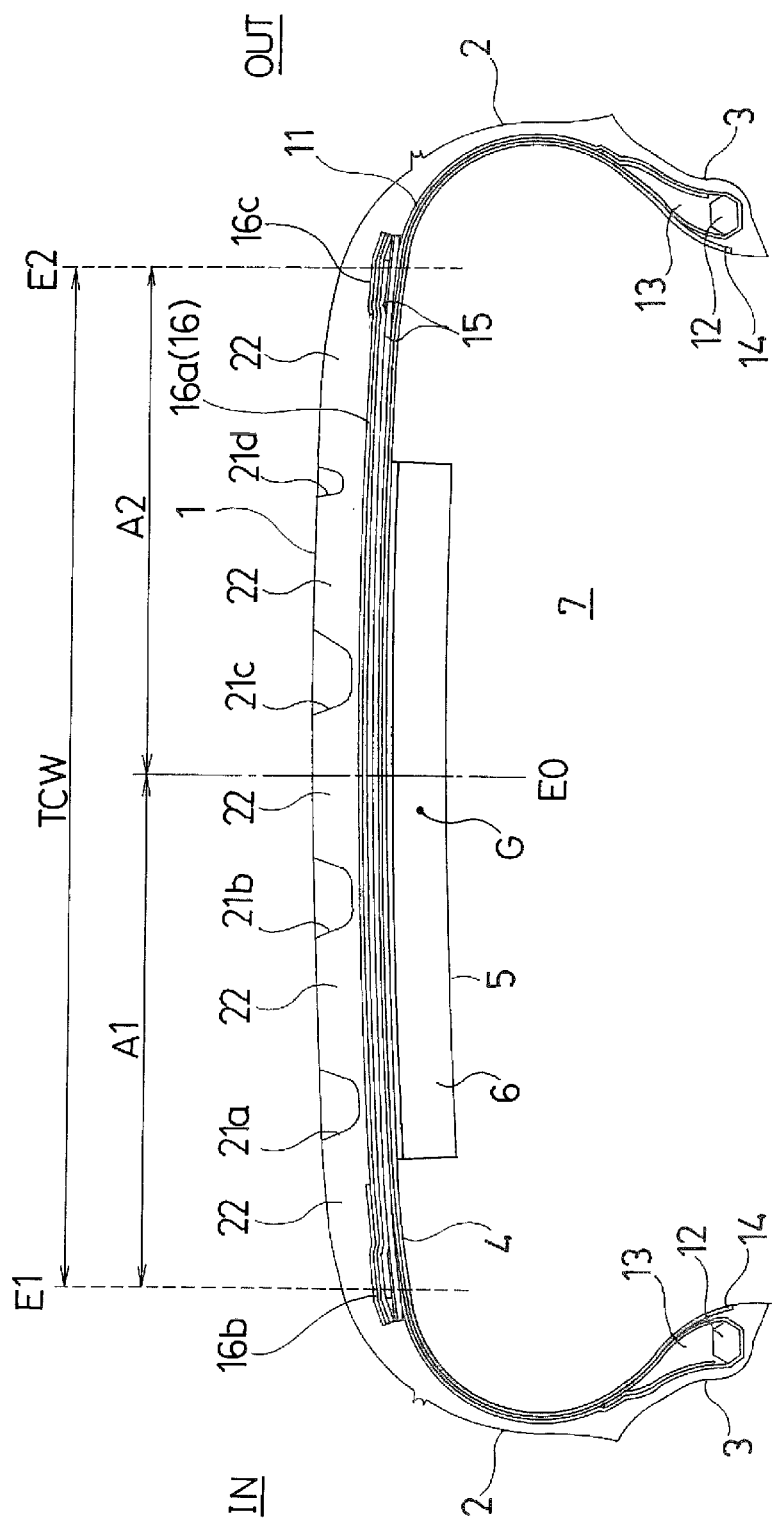
FIG. 7 is a meridian cross-sectional view illustrating a pneumatic tire according to another embodiment of the present technology.
Figure 8:
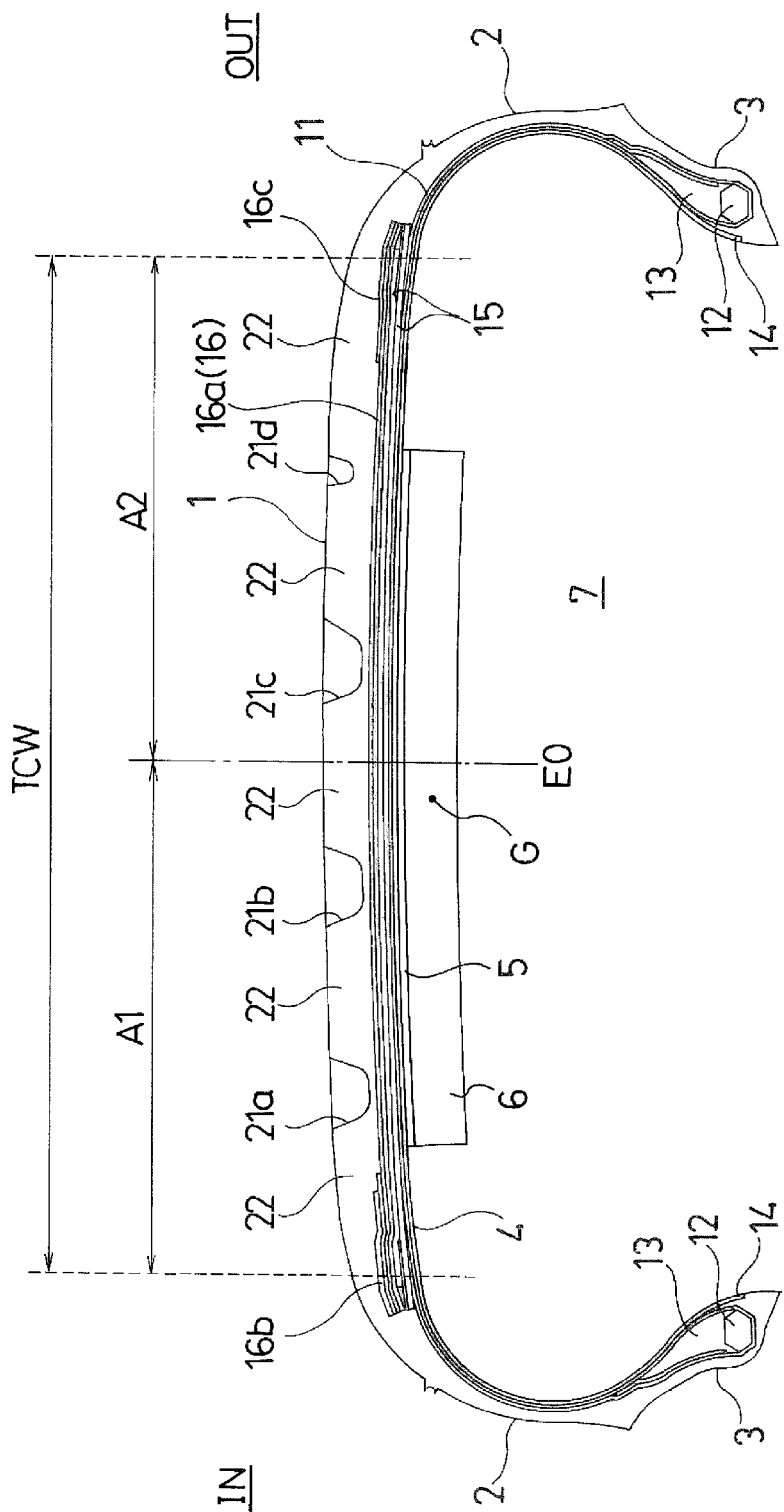
FIG. 8 is a meridian cross-sectional view illustrating a pneumatic tire according to another embodiment of the present technology.

FIGS. 7 and 8 illustrate a pneumatic tire according to another embodiment of the present technology. In FIG. 7 and FIG. 8, components which are the same as those illustrated in FIGS. 1 to 6 will be denoted by the same reference numerals. Detailed descriptions for these components will be omitted. As illustrated in FIGS. 7 and 8, the pneumatic tire of this embodiment is provided with a tread portion 1 extending in the tire circumferential direction to form an annular shape, a pair of sidewall portions 2 that are disposed on both sides of the tread portion 1, and a pair of bead portions 3 that are disposed on the inner side in the tire radial direction of the sidewall portions 2.

A strip-shaped sound-absorbing member 6 is bonded along the tire circumferential direction to a region of the tire inner surface 4 corresponding to the tread portion 1, via the adhesive layer 5. Also, the groove area ratio R1 of the first ground contact region A1 is set larger than the groove area ratio R2 of the second ground contact region A2, as in each of the embodiments described above. Also, the sound-absorbing member 6 is disposed in a position that is offset in the tire width direction, so that the centroid G of the cross-section of the sound-absorbing member 6 in a plane that includes the axis of the tire is positioned within the first ground contact region A1.

A carcass layer 11 is mounted between the pair of bead portions 3, 3. The carcass layer 11 includes a plurality of reinforcing cords extending in the tire radial direction, and is folded back around a bead core 12 disposed in each of the bead portions 3 from the tire inner side to the tire outer side. A bead filler 13 having a triangular cross-sectional shape formed from a rubber composition is disposed on a periphery of the bead core 12. An inner liner layer 14 is layered along the tire inner surface 4 inward of the carcass layer 11.

On the other hand, a plurality of belt layers 15 is embedded on the outer circumferential side of the carcass layer 11 in the tread portion 1. These belt layers 15 include a plurality of reinforcing cords that are inclined with respect to the tire circumferential direction and the reinforcing cords are disposed so that the reinforcing cords of each layer intersect each other. In the belt layers 15, the inclination angle of the reinforcing cords with respect to the tire circumferential direction is set in a range from, for example, 10 to 40°. Steel cords are preferably used as the reinforcing cords of the belt layers 15.

For the purpose of enhancing high-speed durability, at least one layer of a belt cover layer 16 (16a, 16b, 16c) formed by arranging reinforcing cords at an angle of, for example, not more than 5° with respect to the tire circumferential direction, is embedded on the outer circumferential side of the belt layers 15. Aramid or similar organic fiber cords are used as the reinforcing cords of the belt cover layer 16. The belt cover layer 16 includes a belt full cover layer 16a that covers the belt layers 15 over the full width, an inside belt edge cover layer 16b that locally covers the edge of the belt layers 15 on the vehicle inner side, and an outside belt edge cover layer 16c that locally covers the edge of the belt layers 15 on the vehicle outer side.

In FIG. 7, the width of the inside belt edge cover layer 16b is greater than the width of the outside belt edge cover layer 16c, and as a result the stiffness of the inside belt edge cover layer 16b is greater than the stiffness of the outside belt edge cover layer 16c. Also, in FIG. 8, the number of layers (two layers) of the inside belt edge cover layer 16b is greater than the number of layers (one layer) of the outside belt edge cover layer 16c, and as a result the stiffness of the inside belt edge cover layer 16b is greater than the stiffness of the outside belt edge cover layer 16c.

Among pneumatic tires in which the mounting orientation with respect to the vehicle is designated, high-performance tires are normally mounted on vehicles having negative camber angle, and it is required that sufficient high speed durability be provided under these conditions of use. However heat build-up can easily occur at positions on the vehicle inner side of the tread portion 1, and this heat build-up adversely affects the adhesive layer 5 of the sound-absorbing member 6, causing adhesive peeling of the sound-absorbing member 6. In this respect, when the stiffness of the inside belt edge cover layer 16b is greater than the stiffness of the outside belt edge cover layer 16c, deformation of the tread portion 1 at the vehicle inner side is reduced, so heat build-up at that location is reduced, and the adhesive peeling of the sound-absorbing member 6 can be effectively prevented.

In the embodiment as described above, making the width of the inside belt edge cover layer 16b greater than the width of the outside belt edge cover layer 16c and making the number of layers of the inside belt edge cover layer 16b greater than the number of layers of the outside belt edge cover layer 16c have been described as means for making the stiffness of the inside belt edge cover layer 16b greater than the stiffness of the outside belt edge cover layer 16c. However, making the cord count of the inside belt edge cover layer 16b greater than the cord count of the outside belt edge cover layer 16c or making the elastic modulus of the reinforcing cords of the inside belt edge cover layer 16b higher than the elastic modulus of the reinforcing cords of the outside belt edge cover layer 16c can also be used.

Note that a description of the reinforcement structure has been omitted in the embodiments described in FIGS. 1 to 6 above, but it goes without saying that the same reinforcement structure as for FIGS. 7 and 8 or a different reinforcement structure can be applied.

In the pneumatic tire as described above, preferably a single sound-absorbing member 6 extends in the tire circumferential direction, in a cross-section orthogonal to the longitudinal direction the sound-absorbing member 6 has a constant thickness at least in the region corresponding to the bonding surface, and the cross-sectional shape is constant along the longitudinal direction. In particular, preferably the cross-sectional shape in a cross-section orthogonal to the longitudinal direction of the sound-absorbing member 6 is a rectangular shape (including a square shape), but depending on the circumstances it can be an inverted trapezoid so that it becomes narrower towards the ground contact surface side. In this way, the capacity of the sound-absorbing member 6 per unit ground contact area is increased as much as possible, and an excellent noise reduction effect can be obtained. Also, the sound-absorbing member 6 can be easily processed to have this shape, so the manufacturing cost is low.

When the pneumatic tire as described above is assembled onto a rim, a cavity 7 is formed between the tire inner surface 4 and the rim. Preferably the volume of the sound-absorbing member 6 is greater than 20% of the volume of the cavity 7. By increasing the volume of the sound-absorbing member 6 in this way an excellent noise reduction effect can be obtained, and moreover a good bonding state can be maintained over a long period of time, even with a large sound-absorbing member 6. Note that preferably the width of the sound-absorbing member 6 is in the range of 30 to 90% of the ground contact width. Also, preferably the sound-absorbing member 6 is not an annular shape.

Preferably the hardness of the sound-absorbing member 6 (JIS-K6400-2) is from 60 to 170 N, and the tensile strength of the sound-absorbing member 6 (JIS-K6400-5) is from 60 to 180 kPa. A sound-absorbing member 6 with these physical properties has excellent durability against shear strain. If the hardness or the tensile strength of the sound-absorbing member 6 are too low the durability of the sound-absorbing member 6 will be reduced. In particular, preferably the hardness of the sound-absorbing member 6 is from 70 to 160 N, and more preferably from 80 to 140 N. Also, preferably the tensile strength of the sound-absorbing member 6 is from 75 to 165 kPa, and more preferably from 90 to 150 kPa.

Preferably the peeling adhesive strength (JIS-Z0237: 2009) of the adhesive layer 5 is in the range of 8 to 40 N/20 mm. In this way the work of applying the sound-absorbing member 6 and the work of dismantling when the tire is being disposed of can be easily carried out, while maintaining good fixing strength of the sound-absorbing member 6. In other words, if the peeling strength of the adhesive layer 5 is too low the fixing state of the sound-absorbing member 6 will be unstable, and conversely if the peeling strength of the adhesive layer 5 is too high it will be difficult to change the fixing position during the operation of bonding the sound-absorbing member 6, and it will be difficult to peel off the sound-absorbing member 6 when the tire is being disposed of. In particular, preferably the peeling strength of the adhesive layer 5 is from 9 to 30 N/20 mm, and more preferably from 10 to 25 N/20 mm.

In each of the embodiments as described above, it was explained that a significant effect can be obtained when the groove area ratio and the position of the sound-absorbing member are mutually appropriately adjusted on pneumatic tires in which the mounting orientation with respect to the vehicle is designated. However the present technology can also be applied to pneumatic tires in which the mounting orientation with respect to the vehicle is not designated.

EXAMPLES

Pneumatic tires were manufactured having a tire size of 275/35R20 100Y, an annular tread portion extending in the tire circumferential direction, a pair of sidewall portions disposed on both sides of the tread portion, and a pair of bead portions disposed on the inner side in the tire radial direction of the sidewall portions. A pattern of grooves was formed in the tread portion, and a strip-shaped sound-absorbing member was bonded along the tire circumferential direction to a region on the tire inner side corresponding to the tread portion. The position of the sound-absorbing member was varied to produce Comparison Example 1 and Working Examples 1 to 5.

The above pneumatic tires were tires with a designated mounting orientation with respect to the vehicle. The groove area ratio of the first ground contact region disposed on the vehicle inner side was 35%, and the groove area ratio of the second ground contact region disposed on the vehicle outer side was 30%. The total groove area of the second ground contact region was 85% of the total groove area of the first ground contact region. In the pneumatic tires as described above, the belt layers, the inside belt edge cover layer that locally covers the edge of the belt layers on the vehicle inner side, and the outside belt edge cover layer that locally covers the edge of the belt layers on the vehicle outer side were embedded in the tread portion.

In Comparative Example 1, the centroid of the cross-section of the sound-absorbing member in a plane that includes the tire axis was located on the tire equatorial plane. Also, the inner side belt edge cover layer and the outer side belt edge cover layer had the same structure.

In Working Examples 1 to 3, the position of the sound-absorbing member was offset in the tire width direction so that the centroid of the cross-section of the sound-absorbing member in a plane that includes the tire axis was located in the first ground contact region, as illustrated in FIG. 3, and the distance D from the centroid of the sound-absorbing member to the tire equatorial plane as a percentage of the ground contact width TCW of the tread portion 1 was varied. Also, the inner side belt edge cover layer and the outer side belt edge cover layer had the same structure.

In Working Example 4, the sound-absorbing member was disposed in a position that was offset in the tire width direction, as illustrated in FIG. 7, so that the centroid of the cross-section of the sound-absorbing member in a plane that includes the axis of the tire was positioned within the first ground contact region. Also, the width of the inside belt edge cover layer was greater than the width of the outside belt edge cover layer.

In Working Example 5, the sound-absorbing member was disposed in a position that was offset in the tire width direction, as illustrated in FIG. 8, so that the centroid of the cross-section of the sound-absorbing member in a plane that includes the axis of the tire was positioned within the first ground contact region. Also, the number of layers of the inside belt edge cover layer was greater than the number of layers of the outside belt edge cover layer.

In Comparative Example 1 and Working Examples 1 to 5, the following items were common. The cross-sectional shape of the sound-absorbing member in a cross-section orthogonal to the longitudinal direction was a rectangular shape, and this cross-sectional shape was constant along the tire circumferential direction. The volume of the sound-absorbing member as a percentage of the volume of the cavity formed within the tire when the tire was assembled on the rim was 30%. The hardness of the sound-absorbing member was 91 N, and the tensile strength of the sound-absorbing member was 132 kPa. The peeling adhesive strength of the adhesive layer was 16 N/20 mm.

The pneumatic tires of Comparative Example 1 and Working Examples 1 to 5 were assembled onto a wheel with a rim size 20×9.5J, and after a running test was carried out for 40 hours using a drum testing machine under the conditions of air pressure 200 kPa, load 6.9 kN, and speed 300 km/h, it was visually checked whether or not there was adhesive peeling of the sound-absorbing member. The results were recorded in Table 1.

TABLE 1

|  | Comparative Example 1 | Working Example 1 | Working Example 2 |
|---|---|---|---|
| Centroid position of sound-absorbing member | On tire equatorial plane | In first ground contact region (FIG. 3) | In first ground contact region (FIG. 3) |
| D/TCW × 100% | — | 20 | 10 |
| Structure of belt edge cover layer | Same inside and outside | Same inside and outside | Same inside and outside |
| Presence/absence of adhesive peeling of the sound-absorbing member | Presence | Absence | Absence |
| Adhesive peeling prevention performance (index) | — | 100 | 88 |

|  | Working Example 3 | Working Example 4 | Working Example 5 |
|---|---|---|---|
| Centroid position of sound-absorbing member | In first ground contact region (FIG. 3) | In first ground contact region (FIG. 7) | In first ground contact region (FIG. 8) |
| D/TCW × 100% | 30 | 20 | 20 |
| Structure of belt edge cover layer | Same inside and outside | Wider on inside (FIG. 7) | More layers on inside (FIG. 8) |
| Presence/absence of adhesive peeling of the sound-absorbing member | Absence | Absence | Absence |
| Adhesive peeling prevention performance (index) | 88 | 113 | 113 |

As shown in Table 1, with the tire of Comparative Example 1 there was significant occurrence of adhesive peeling of the sound-absorbing member, but in the case of the tires of Working Examples 1 to 5, there was no adhesive peeling of the sound-absorbing member observed.

In addition, for the pneumatic tires of Working Examples 1 to 5, the same running test as described above was carried out in 10 hour units, and the distance traveled until adhesive peeling of the sound-absorbing member was found was obtained. The results were expressed as an index of adhesive peeling prevention, with the measured value for Working Example 1 as 100. The higher the index value, the more difficult the adhesive peeling of the sound-absorbing member.

Next, tires in accordance with Working Examples 6 to 12 were prepared having the same structure as Working Example 1 except that the hardness of the sound-absorbing member, the tensile strength of the sound-absorbing member, the peeling adhesive strength of the adhesive layer, the groove area ratio of the first ground contact region, and the groove area ratio of the second ground contact region were varied.

The presence or absence of adhesive peeling of the sound absorbing member and the adhesive peeling prevention performance after 40 hours of the running test were evaluated for the tires according to Working Examples 6 to 12 by the same methods as described above. The results were recorded in Table 2.

TABLE 2

| | Working Example 6 | Working Example 7 | Working Example 8 | Working Example 9 |
|---|---|---|---|---|
| Centroid position of sound-absorbing member | In first ground contact region (FIG. 3) | In first ground contact region (FIG. 3) | In first ground contact region (FIG. 3) | In first ground contact region (FIG. 3) |
| D/TCW × 100% | 20 | 20 | 20 | 20 |
| Structure of belt edge cover layer | Same inside and outside | Same inside and outside | Same inside and outside | Same inside and outside |
| Hardness of sound-absorbing member (N) | 60 | 170 | 91 | 91 |
| Tensile strength of sound-absorbing member (kPa) | 60 | 180 | 132 | 132 |
| Peeling adhesive strength of the adhesive (N/20 mm) | 16 | 16 | 8 | 40 |
| Groove area ratio of the first ground contact region (%) | 35 | 35 | 35 | 35 |
| Groove area ratio of the second ground contact region (%) | 30 | 30 | 30 | 30 |
| Presence/absence of adhesive peeling of the sound-absorbing member | Absence | Absence | Absence | Absence |
| Adhesive peeling prevention performance (index) | 100 | 100 | 95 | 105 |

| | Working Example 10 | Working Example 11 | Working Example 12 |
|---|---|---|---|
| Centroid position of sound-absorbing member | In first ground contact region (FIG. 3) | In first ground contact region (FIG. 3) | In first ground contact region (FIG. 3) |
| D/TCW × 100% | 20 | 20 | 20 |
| Structure of belt edge cover layer | Same inside and outside | Same inside and outside | Same inside and outside |
| Hardness of sound-absorbing member (N) | 91 | 91 | 91 |
| Tensile strength of sound-absorbing member (kPa) | 132 | 132 | 132 |
| Peeling adhesive strength of the adhesive (N/20 mm) | 16 | 16 | 16 |
| Groove area ratio of the first ground contact region (%) | 30 | 43 | 39 |
| Groove area ratio of the second ground contact region (%) | 25 | 30 | 35 |
| Presence/absence of adhesive peeling of the sound-absorbing member | Absence | Absence | Absence |
| Adhesive peeling prevention performance (index) | 100 | 90 | 95 |

As shown in Table 2, with the tires according to Working Examples 6 to 9 in which the hardness of the sound-absorbing member, the tensile strength of the sound-absorbing member, and the adhesive peeling strength of the adhesive layer were varied, there was no adhesive peeling of the sound-absorbing member found after 40 hours of the running test, the same as for Working Example 1. Also, in the tires according to Working Examples 10 to 12 in which the groove area ratio of the first ground contact region and the second ground contact region was varied, the same result was obtained.

The invention claimed is:

1. A pneumatic tire, comprising:
an annular tread portion extending in a tire circumferential direction;
a pair of sidewall portions disposed on two sides of the tread portion;
a pair of bead portions disposed on an inner side in a tire radial direction of the sidewall portions;
a pattern of grooves formed on the tread portion; and
a strip-shaped sound-absorbing member bonded along the tire circumferential direction to a region of an tire inner surface corresponding to the tread portion via an adhesive layer, wherein
when a first ground contact region is specified between a tire ground contact edge on one side in a tire width direction and a tire equatorial plane, and a second ground contact region is defined between a tire ground contact edge on the other side in the tire width direction and the tire equatorial plane, a groove area ratio of the first ground contact region is greater than a groove area ratio of the second ground contact region, and the sound-absorbing member is disposed in a position offset with respect to the tire width direction so that a centroid of a cross-section of the sound-absorbing member in a plane that includes a tire axis is located within the first ground contact region;
the sound-absorbing member is discontinuous in the tire circumferential direction;
a thickness of the sound-absorbing member is constant at least in a region corresponding to an adhesive surface in a cross-section orthogonal to a longitudinal direction of the sound-absorbing member; and
a volume of the sound-absorbing member as a percentage of a volume of a cavity formed within the tire when the tire is assembled on a rim is at least 21%.

2. The pneumatic tire according to claim 1, wherein
a total groove area of the second ground contact region is from 70 to 90% of a total groove area of the first ground contact region, and a distance from the centroid of the sound-absorbing member to the tire equatorial plane is from 5 to 30% of a ground contact width of the tread portion.

3. The pneumatic tire according to claim 1, wherein
the pneumatic tire has a designated mounting orientation with respect to a vehicle, the first ground contact region is disposed on a vehicle inner side, and the second ground contact region is disposed on a vehicle outer side.

4. The pneumatic tire according to claim 3, wherein
the groove area ratio of the first ground contact region is from 30 to 43%, and the groove area ratio of the second ground contact region is from 25 to 35%.

5. The pneumatic tire according to claim 3, wherein
a belt layer, an inside belt edge cover layer that locally covers an edge of the belt layer on the vehicle inner side, and an outside belt edge cover layer that locally covers an edge of the belt layer on the vehicle outer side are embedded in the tread portion, and a stiffness of the inside belt edge cover layer is greater than a stiffness of the outside belt edge cover layer.

6. The pneumatic tire according to claim 3, wherein
a belt layer, an inside belt edge cover layer that locally covers an edge of the belt layer on the vehicle inner side, and an outside belt edge cover layer that locally covers an edge of the belt layer on the vehicle outer side are embedded in the tread portion, and a width of the inside belt edge cover layer is greater than a width of the outside belt edge cover layer.

7. The pneumatic tire according to claim 3, wherein a belt layer, an inside belt edge cover layer that locally covers an edge of the belt layer on the vehicle inner side, and an outside belt edge cover layer that locally covers an edge of the belt layer on the vehicle outer side are embedded in the tread portion, and the number of layers of the inside belt edge cover layer is greater than the number of layers of the outside belt edge cover layer.

8. The pneumatic tire according to claim 1, wherein the sound-absorbing member is a single sound-absorbing member extending in the tire circumferential direction, and a cross-sectional shape thereof is constant along the longitudinal direction.

9. The pneumatic tire according to claim 1, wherein a hardness of the sound-absorbing member is from 60 to 170 N, and a tensile strength of the sound-absorbing member is from 60 to 180 kPa.

10. The pneumatic tire according to claim 1, wherein the adhesive layer is made from double-sided adhesive tape, with a peeling adhesive strength in the range of 8 to 40 N/20 mm.

11. The pneumatic tire according to claim 1, wherein the sound-absorbing member is configured from a porous material having open cells.

12. The pneumatic tire according to claim 11, wherein the sound-absorbing member is polyurethane foam.

13. The pneumatic tire according to claim 1, wherein a hardness of the sound-absorbing member is from 85 to 170 N, and a tensile strength of the sound-absorbing member is from 60 to 180 kPa.

* * * * *